United States Patent
Zheng

(10) Patent No.: US 12,182,183 B2
(45) Date of Patent: Dec. 31, 2024

(54) ROBOT RESPONSE METHOD, APPARATUS, DEVICE AND STORAGE MEDIUM

(71) Applicant: JINGDONG TECHNOLOGY HOLDING CO., LTD., Beijing (CN)

(72) Inventor: Yuyu Zheng, Beijing (CN)

(73) Assignee: JINGDONG TECHNOLOGY HOLDING CO., LTD., Beijing (CN)

( * ) Notice: Subject to any disclaimer, the term of this patent is extended or adjusted under 35 U.S.C. 154(b) by 264 days.

(21) Appl. No.: 17/785,369

(22) PCT Filed: Apr. 20, 2020

(86) PCT No.: PCT/CN2020/085530
§ 371 (c)(1),
(2) Date: Jun. 14, 2022

(87) PCT Pub. No.: WO2021/128663
PCT Pub. Date: Jul. 1, 2021

(65) Prior Publication Data
US 2023/0028830 A1    Jan. 26, 2023

(30) Foreign Application Priority Data

Dec. 27, 2019 (CN) .......................... 201911376518.4

(51) Int. Cl.
*G06F 16/35* (2019.01)
*G06F 16/33* (2019.01)
(Continued)

(52) U.S. Cl.
CPC ...... *G06F 16/3329* (2019.01); *G06F 16/3344* (2019.01); *G06F 16/35* (2019.01); *H04L 51/02* (2013.01)

(58) Field of Classification Search
CPC .................................. H04L 51/02; G06N 5/02
See application file for complete search history.

(56) References Cited

U.S. PATENT DOCUMENTS

| | | | |
|---|---|---|---|
| 8,645,122 B1 * | 2/2014 | Di Fabbrizio | G06F 40/237 704/251 |
| 10,692,006 B1 * | 6/2020 | Zhang | G06N 3/08 |

(Continued)

FOREIGN PATENT DOCUMENTS

| | | |
|---|---|---|
| CN | 101431573 A | 5/2009 |
| CN | 101739812 A | 6/2010 |

(Continued)

OTHER PUBLICATIONS

The First Office Action dated May 6, 2021 for Chinese application No. 201911376518.4.
The Second Office Action dated Jul. 27, 2021 for Chinese application No. 201911376518.4.
Extended European Search Report dated Nov. 21, 2023 for Application No. 20906575.4.

*Primary Examiner* — Jesse S Pullias

(57) ABSTRACT

The present application provides a robot response method, apparatus, device and storage medium. The method includes: obtaining, by a robot, current query voice; extracting semantic information of the current query voice; matching the semantic information of the current query voice with multiple semantic information clusters stored in advance to get a matched target semantic information cluster, where each semantic information cluster includes: at least one Q&A instance, and each Q&A instance includes: semantic information corresponding to a historical query voice and a query question selected in a query list corresponding to the historical query voice; and obtaining, by the robot, the number of times each query question was selected in the target semantic information cluster, determining, according to the number of times each query question was selected, a target query question corresponding to the current query voice, and outputting a query response corresponding to the target query question.

18 Claims, 10 Drawing Sheets

(51) Int. Cl.
*G06F 16/332* (2019.01)
*H04L 51/02* (2022.01)

(56) References Cited

U.S. PATENT DOCUMENTS

| | | | |
|---|---|---|---|
| 10,922,342 B2* | 2/2021 | Wang | G06N 20/00 |
| 11,151,992 B2* | 10/2021 | Cui | G06V 40/161 |
| 11,416,678 B2* | 8/2022 | Hoshino | G06F 40/226 |
| 11,645,459 B2* | 5/2023 | Galitsky | G06F 40/211 |
| | | | 704/9 |
| 2007/0194912 A1 | 8/2007 | Lee et al. | |
| 2016/0132773 A1 | 5/2016 | Chandrasekaran et al. | |
| 2019/0188590 A1* | 6/2019 | Wu | G06F 40/30 |
| 2019/0377824 A1 | 12/2019 | Wang et al. | |
| 2020/0227026 A1* | 7/2020 | Rajagopal | G06F 16/244 |

FOREIGN PATENT DOCUMENTS

| | | |
|---|---|---|
| CN | 103810218 A | 5/2014 |
| CN | 106709018 A | 5/2017 |
| CN | 106779570 A | 5/2017 |
| CN | 107977739 A | 5/2018 |
| CN | 108090174 A | 5/2018 |
| CN | 109145099 A | 1/2019 |
| CN | 109829048 A | 5/2019 |
| CN | 110059934 A | 7/2019 |
| CN | 110334200 A | 10/2019 |
| CN | 110569356 A | 12/2019 |

* cited by examiner

ROBOT RESPONSE METHOD, APPARATUS, DEVICE AND STORAGE MEDIUM

CROSS-REFERENCE TO RELATED APPLICATIONS

The present application is a National Stage of International Application No. PCT/CN2020/085530, filed on Apr. 20, 2020, which claims priority to Chinese patent application No. 2019113765184, filed in China National Intellectual Property Administration on Dec. 27, 2019, entitled "ROBOT RESPONSE METHOD, APPARATUS, DEVICE AND STORAGE MEDIUM", both of which are incorporated herein by reference in their entireties.

TECHNICAL FIELD

The present application relates to the field of communication technology, and in particular, to a robot response method, apparatus, device and storage medium.

BACKGROUND

The chatbot system can be online all the time by means of communication and can communicate with people through natural language. There are a large number of questions and corresponding answers stored in the chatbot system. After the user inputs a question, the chatbot will find the corresponding answer according to the question and feed it back to the user.

SUMMARY

The present application provides a robot response method, apparatus, device and storage medium.

In a first aspect, the present application provides a robot response method, including: obtaining a current query voice; extracting semantic information of the current query voice; matching the semantic information of the current query voice with multiple semantic information clusters stored in advance to get a matched target semantic information cluster, where each semantic information cluster includes: at least one question and answer (Q&A) instance, and each Q&A instance includes: semantic information corresponding to a historical query voice and a query question selected in a query list corresponding to the historical query voice; obtaining the number of times each query question was selected in the target semantic information cluster, determining, according to the number of times each query question was selected, a target query question corresponding to the current query voice, and outputting a query response corresponding to the target query question.

In an embodiment, the matching the semantic information of the current query voice with multiple semantic information clusters stored in advance, includes: determining a similarity between the semantic information of the current query voice and the semantic information corresponding to each historical query voice in the multiple semantic information clusters; and if the similarity between the semantic information of the current query voice and the semantic information corresponding to the historical query voice in one semantic information cluster is greater than a first preset similarity, using the semantic information cluster as the target semantic information cluster.

In an embodiment, the determining, according to the number of times each query question was selected, a target query question corresponding to the current query voice, includes: determining, among the query questions, the query question whose number of times of being selected is greater than the preset number of times as the target query question.

In an embodiment, the method further includes: receiving the multiple semantic information clusters sent by a server.

In a second aspect, the present application provides a robot response method, including: obtaining multiple semantic information clusters, where each semantic information cluster includes: at least one Q&A instance, and each Q&A instance includes: semantic information corresponding to a historical query voice and a query question selected in a query list corresponding to the historical query voice; and sending the multiple semantic information clusters to a robot, so as to enable the robot match the multiple semantic information clusters with the semantic information of the current query voice, to get a matched target semantic information cluster, determine, according to the number of times each query question was selected in the target semantic information cluster, a target query question corresponding to the current query voice, and output a query response corresponding to the target query question.

In an embodiment, before the obtaining multiple semantic information clusters, the method further includes: obtaining multiple Q&A instances; correspondingly, the obtaining multiple semantic information clusters, includes: determining a similarity of the semantic information in every two Q&A instances among the multiple Q&A instances; and classifying Q&A instances whose similarity is greater than a second preset similarity into a same one semantic information cluster. The semantic information cluster is classified, and it is determined whether it is the same semantic information cluster according to the similarity. Alternatively, before the obtaining multiple semantic information clusters, the method further includes: obtaining at least one basic semantic information cluster and at least one Q&A instance; correspondingly, the obtaining multiple semantic information clusters, includes: updating the at least one basic semantic information cluster according to the at least one Q&A instance to obtain the multiple semantic information clusters. That is, upon these two methods, similar Q&A instances can be used as a semantic information cluster, and there may be, in the similar Q&A instances, similar or same query questions being selected, so that the robot can count the number of times each query question was selected, and then can determine the target query question corresponding to the current query voice according to the number of times each query question was selected, output the query response corresponding to the target query question.

In an embodiment, the updating the at least one basic semantic information cluster according to the at least one Q&A instance to obtain the multiple semantic information clusters, includes: determining a similarity between each semantic information in the at least one Q&A instance and each semantic information in the at least one basic semantic information cluster; and for each Q&A instance in the at least one Q&A instance, dividing the Q&A instance into a basic semantic information cluster in the at least one basic semantic information cluster whose similarity with the Q&A instance is greater than a third preset similarity.

In an embodiment, the method further includes: obtaining the number of times each query question was selected in the multiple semantic information clusters; and sending the number of times each query question was selected in the multiple semantic information clusters to the robot, so that the robot can determine, according to the number of times each query question was selected, the target query question corresponding to the current query voice, and output the query response corresponding to the target query question.

The present application further provides a robot response apparatus, device, readable storage medium and computer program product, of which the effects can be referred to the corresponding effects of the above method, which will not be repeated below.

In a third aspect, the present application provides a robot response apparatus, including: a first obtaining module, an extraction module, a matching module, a second obtaining module, a determination module and an output module, where the first obtaining module is configured to obtain a current query voice; the extraction module is configured to extract semantic information of the current query voice; the matching module is configured to match the semantic information of the current query voice with multiple semantic information clusters stored in advance to get a matched target semantic information cluster, where each semantic information cluster includes: at least one Q&A instance, and each Q&A instance includes: semantic information corresponding to a historical query voice and a query question selected in a query list corresponding to the historical query voice; the second obtaining module is configured to obtain the number of times each query question was selected in the target semantic information cluster; the determination module is configured to determine, according to the number of times each query question was selected, a target query question corresponding to the current query voice; and the output module is configured to output a query response corresponding to the target query question.

In an embodiment, the matching module is specifically configured to: determine a similarity between the semantic information of the current query voice and the semantic information corresponding to each historical query voice in the multiple semantic information clusters; and if the similarity between the semantic information of the current query voice and the semantic information corresponding to the historical query voice in one semantic information cluster is greater than a first preset similarity, use the semantic information cluster as the target semantic information cluster.

In an embodiment, the determination module is specifically configured to: determine, among the query questions, the query question whose number of times of being selected is greater than a preset number of times as the target query question.

In an embodiment, the robot response apparatus further includes: a receiving module, configured to receive the multiple semantic information clusters sent by a server.

In a fourth aspect, the present application provides a robot response apparatus, including: a first obtaining module, configured to obtain multiple semantic information clusters, where each semantic information cluster includes: at least one Q&A instance, and each Q&A instance includes: semantic information corresponding to a historical query voice and a query question selected in a query list corresponding to the historical query voice; and a first sending module, configured to send the multiple semantic information clusters to a robot.

In an embodiment, the robot response apparatus further includes: a second obtaining module, configured to obtain multiple Q&A instances; correspondingly, the first obtaining module is specifically configured to: determine a similarity of the semantic information in every two Q&A instances among the multiple Q&A instances; and classifying Q&A instances whose similarity is greater than a second preset similarity into a same one semantic information cluster.

In an embodiment, the robot response apparatus further includes: a third obtaining module, configured to obtain at least one basic semantic information cluster and at least one Q&A instance; correspondingly, the first obtaining module is specifically configured to: update the at least one basic semantic information cluster according to the at least one Q&A instance to obtain the multiple semantic information clusters.

In an embodiment, the first obtaining module is specifically configured to: determine a similarity between each semantic information in the at least one Q&A instance and each semantic information in the at least one basic semantic information cluster; and for each Q&A instance in at least one Q&A instance, divide the Q&A instance into a basic semantic information cluster in the at least one basic semantic information cluster whose similarity with the Q&A instance is greater than a third preset similarity.

In an embodiment, the robot response apparatus further includes: a fourth obtaining module, configured to obtain the number of times each query question was selected in the multiple semantic information clusters; and a second sending module, configured to send the number of times each query question was selected in the multiple semantic information clusters to the robot.

In a fifth aspect, an embodiment of the present application provides a non-transitory computer-readable storage medium storing computer instructions, which enables a computer to perform the robot response method according to the first aspect or any one of the optional implementations of the first aspect as such.

In a sixth aspect, an embodiment of the present application provides a non-transitory computer-readable storage medium storing computer instructions, which enables a computer to perform the robot response method according to the second aspect or any one of the optional implementations of the second aspect as such.

In a seventh aspect, an embodiment of the present application provides a computer program product, and the product includes computer instructions, which enables a computer to perform the robot response method according to the first aspect or any one of the optional implementations of the first aspect as such.

In an eighth aspect, an embodiment of the present application provides a computer program product, and the product includes computer instructions, which enables a computer to perform the robot response method according to the second aspect or any one of the optional implementations of the second aspect as such.

In the robot response method, apparatus, device and storage medium provided in the present application, a robot obtains current query voice; extracts semantic information of the current query voice; matches the semantic information of the current query voice with multiple semantic information clusters stored in advance to get a matched target semantic information cluster, where each semantic information cluster includes: at least one Q&A instance, and each Q&A instance includes: semantic information corresponding to a historical query voice and a query question selected in a query list corresponding to the historical query voice; and obtains the number of times each query question was selected in the target semantic information cluster, determines, according to the number of times each query question was selected, a target query question corresponding to the current query voice, and outputs a query response corresponding to the target query question.

BRIEF DESCRIPTION OF THE DRAWINGS

The accompanying drawings, which are incorporated into and constitute a part of this specification, illustrate embodiments consistent with the present disclosure, and together with the description, serve to explain the principles of the present disclosure.

The specific embodiments of the present disclosure have been shown in the above accompanying drawings and will be described in more detail later. These drawings and text descriptions are not intended to limit the scope of the concept of the present disclosure in any way, but to explain the concept of the present disclosure to those skilled in the art by referring to specific embodiments.

DESCRIPTION OF EMBODIMENTS

The technical solutions in the embodiments of the present application will be clearly and completely described below in conjunction with the accompanying drawings in the embodiments of the present application. Apparently, the described embodiments are a part of the embodiments of the present application, rather than all of the embodiments. Based on the embodiments in the present application, all other embodiments obtained by those of ordinary skill in the art without creative work shall fall within the scope of protection of the present application.

Figure 1:
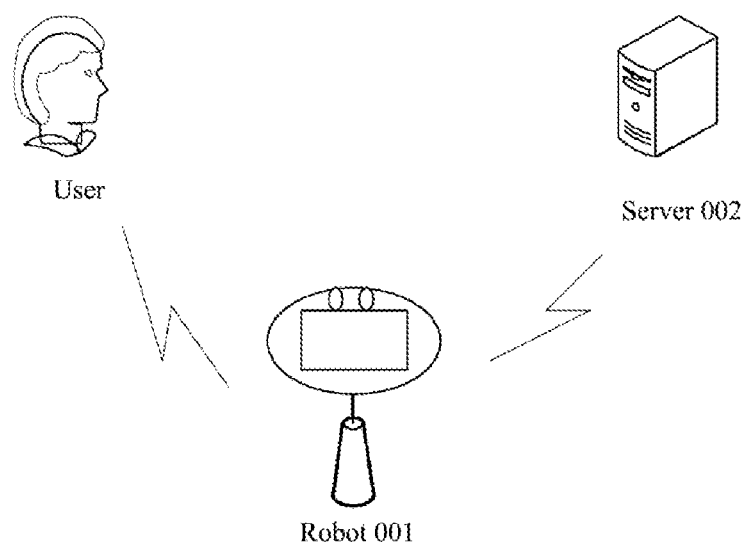
FIG. 1 is a schematic diagram of an application scenario according to the present application.

Illustratively, FIG. 1 is a schematic diagram of an application scenario according to the present application. As shown in FIG. 1, a robot 001 is configured to realize the interactive response with the user, and such robot stores therein multiple semantic information clusters and elastic search (ES), where each semantic information cluster includes: at least one Q&A instance, and each Q&A instance includes: semantic information corresponding to a historical query voice and a query question selected in a query list corresponding to the historical query voice; the ES stores therein the query response corresponding to the query question, that is, an answer corresponding to the query question. A server 002 is configured to establish multiple semantic information clusters, and send the multiple semantic information clusters to the robot 001. In an embodiment, the server 002 can also train a neural network model, and send the trained neural network model to the robot 001, so that the robot 001 can determine the semantic information corresponding to the query voice through the neural network model.

However, the questions and answers stored in the chatbot system are limited, and there is no clear answer, in the system, to some questions input by the user. In the related art, for the question that is input by the user and has no clear answer, the chatbot will give a list of answers, the content in the list is similar to the user's question, this list is retrieved from the database, and the user needs to click on the question in the given list to get the desired answer. With the method in the related art, the efficiency in obtaining, by the user while interacting with the robot, accurate answers to the question is low.

In order to solve the above technical problem, the present application provides a robot response method, apparatus, device and storage medium. The main idea of the present application is that: the robot determines the target semantic information cluster corresponding to the current query voice, determines, according to the number of times each query question was selected in the target semantic information cluster, the target query question, and output the query response corresponding to the target query question.

The technical solution of the present application is described in detail below.

Figure 2:
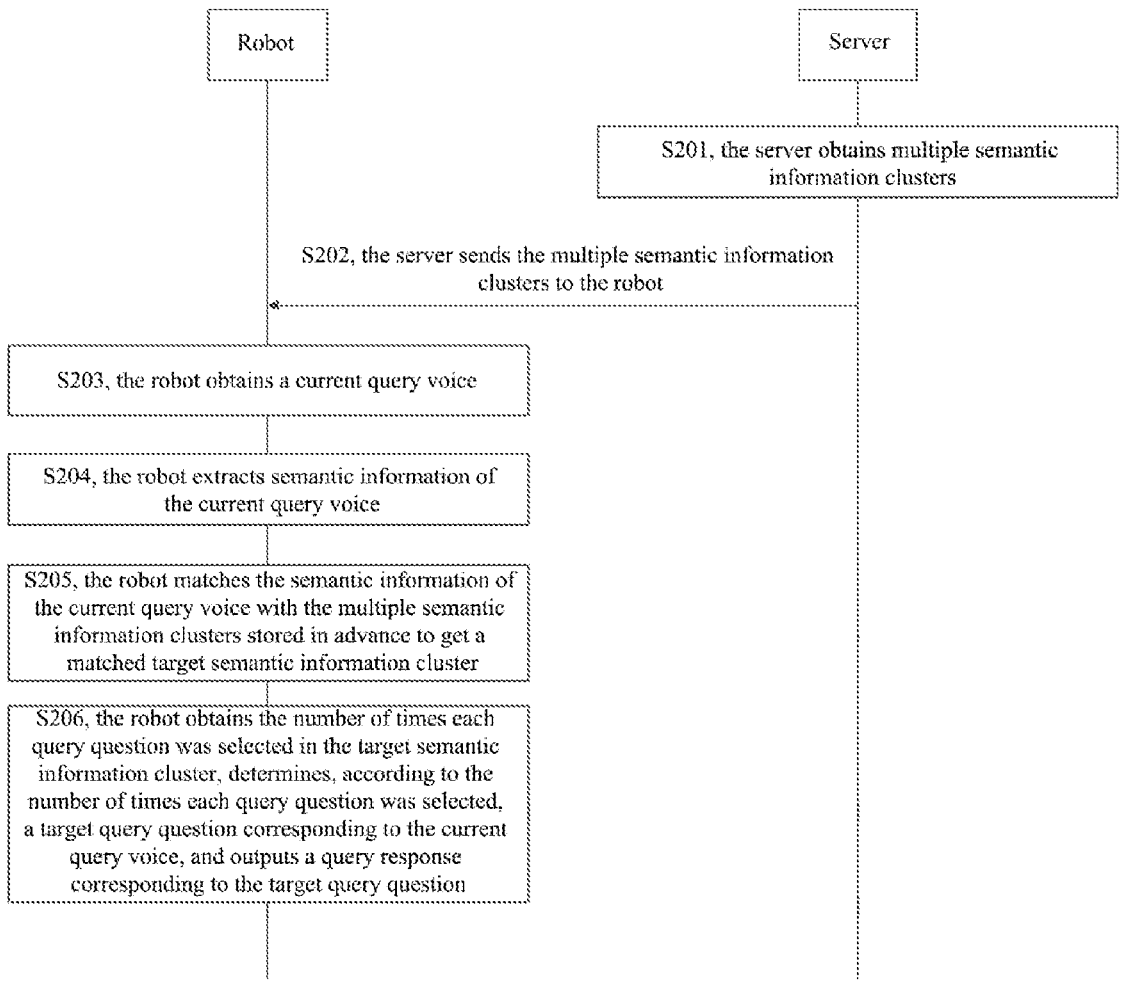
FIG. 2 is an interactive flowchart of a robot response method according to the present application.

FIG. 2 is an interactive flowchart of a robot response method according to the present application. The network elements involved in the method include: a robot and a server; as shown in FIG. 2, the method includes following steps.

S201, the server obtains multiple semantic information clusters.

Each semantic information cluster includes: at least one Q&A instance, and each Q&A instance includes: semantic information corresponding to a historical query voice and a query question selected in a query list corresponding to the historical query voice.

Figure 3:
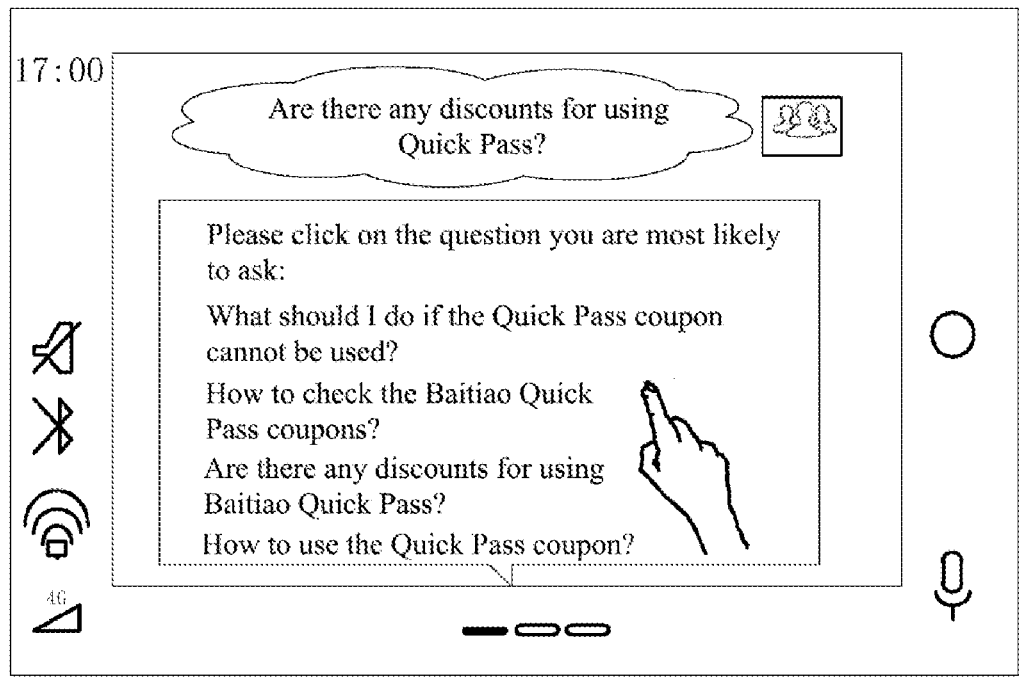
FIG. 3 is a schematic diagram of a query list of a robot.

For example: FIG. 3 is a schematic diagram of a query list of a robot. As shown in FIG. 3, when there is no clear answer to the question input by the user, the robot displays historical query questions having a certain similarity to the user's voice to the user in the form of a list, and all historical query questions in the same list have the same or similar semantic information.

S202, the server sends the multiple semantic information clusters to the robot.

S203, the robot obtains the current query voice.

S204, the robot extracts semantic information of the current query voice.

S205, the robot matches the semantic information of the current query voice with the multiple semantic information clusters stored in advance to get a matched target semantic information cluster.

S206, the robot obtains the number of times each query question was selected in the target semantic information cluster, determines, according to the number of times each query question was selected, a target query question corresponding to the current query voice, and outputs a query response corresponding to the target query question.

Steps S203 and 204 are described as follows.

In an embodiment, the robot collects current query voice of the user through a microphone, and extracts semantic information of the current query voice through a neural network model. The neural network model consists of the structure of Bidirectional Encoder Representation from Transformers (BERT)+Convolutional Neural Network (CNN)+fully connected layers (FC). The server can be configured to train the neural network model, and then send the trained neural network model to the robot, so that the robot can use the current query voice as the input of the neural network model, to get the semantic information of the current query voice. The essence of the training process of the neural network model by the server is that the server trains the parameters involved in the neural network model.

The input of the above BERT model is the query voice, and first semantic information of the query voice is obtained. While CNN is a feedforward neural network whose artificial neurons can respond to a part of surrounding cells in the coverage area, including a convolutional layer and a pooling layer; the convolutional layer is used to perform convolutional operation on the first semantic information, so as to obtain the output of all or part of the hidden layer to obtain second semantic information, and the pooling layer is used to reduce the dimension of the second semantic information to obtain third semantic information of the query voice. It should be noted that any of the above semantic information may be referred to as a semantic vector or a semantic matrix. The FC layer plays the role of "classifier" in the whole neural network model, performs weighted summation of the third semantic information and the second semantic information, that is, through the fully connected layer, and outputs final semantic information corresponding to the query voice.

Steps S205 and S206 are described as follows.

In an embodiment, after the robot extracts the semantic information of the current query voice, the robot first determines whether there is a unique query question corresponding to the semantic information; if yes, steps S205 and S206 are not performed; if there are multiple query questions corresponding to the semantic information, steps S205 and S206 are performed.

In an embodiment, the above multiple semantic information clusters can be stored in advance in the local storage space of the robot, and they can also be stored in the cloud storage space, which is not limited in the present application.

The so-called "the robot matches the semantic information of the current query voice with the multiple semantic information clusters stored in advance" refers to the case that the robot matches the semantic information of the current query voice with the semantic information in each semantic information cluster.

In an embodiment, the robot obtains, from the server, the number of times each query question was selected in the multiple semantic information clusters, or the robot counts the number of times each query question was selected in the multiple semantic information clusters.

In an embodiment, in each query question, the query question whose number of times of being selected is greater than a preset number of times is determined as the target query question, or each query question corresponds to a priority, and the robot can select the query question with the highest priority as the target query question. The above preset number of times can be set as required, such as 100 or 1000, which is not limited in the present application.

The robot queries the query response corresponding to the target query question in the ES and outputs the query response to the user. The ES is a distributed, high expansion, high real-time search and data analysis engine, and it can easily make large amounts of data have the ability to search, analyze and explore.

Figure 4A:
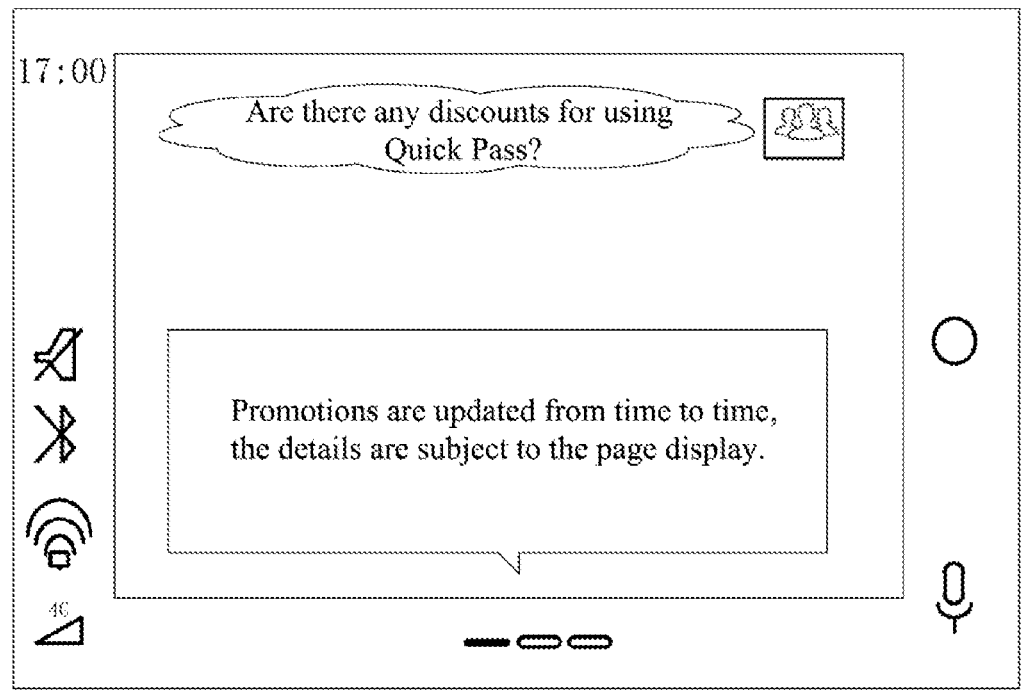
FIG. 4A is a schematic diagram of an interface according to an embodiment of the present application.
Figure 4B:
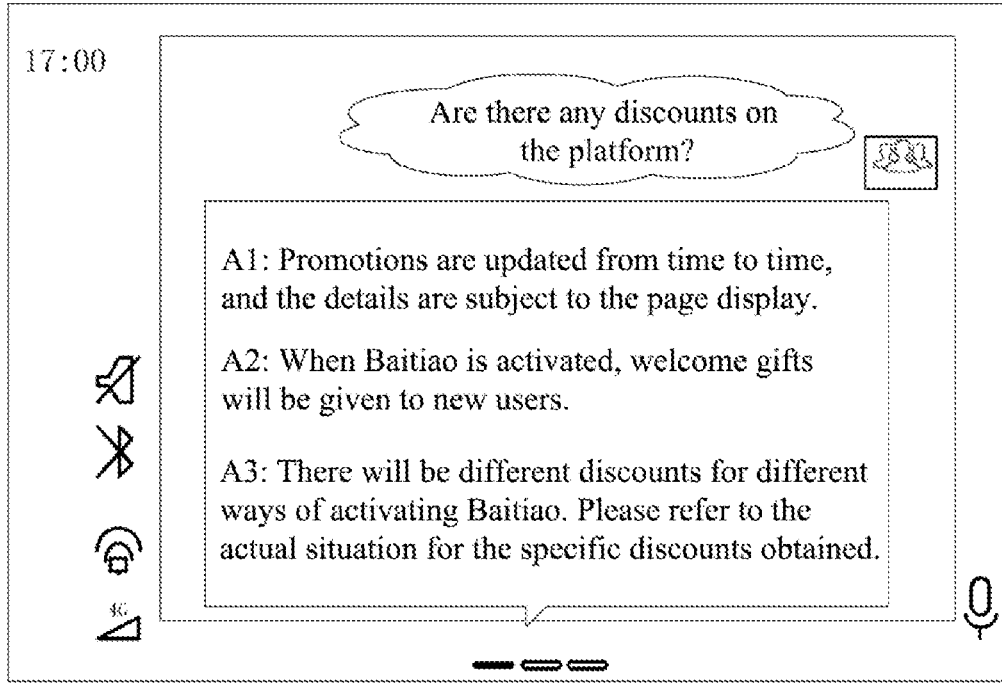
FIG. 4B is a schematic diagram of another interface according to an embodiment of the present application.

The above robot determines, according to the number of times each query question was selected, that there may be one or more target query questions corresponding to the current query voice, and each query question corresponds to one query response. Finally, the robot can present one or more query responses. For example: FIG. 4A is a schematic diagram of an interface according to an embodiment of the present application. As shown in FIG. 4A, the robot displays the corresponding query response "Promotions are updated from time to time, the details are subject to the page display" regarding the target query question "Are there any discounts for using Quick Pass?". FIG. 4B is a schematic diagram of an interface according to another embodiment of the present application. As shown in FIG. 4B, the robot displays the corresponding query response "A1: Promotions are updated from time to time, and the details are subject to the page display. A2: When Baitiao is activated, welcome gifts will be given to new users. A3: There will be different discounts for different ways of activating Baitiao. Please refer to the actual situation for the specific discounts obtained" regarding the target query question "Are there any discounts on the platform?".

Figure 5:
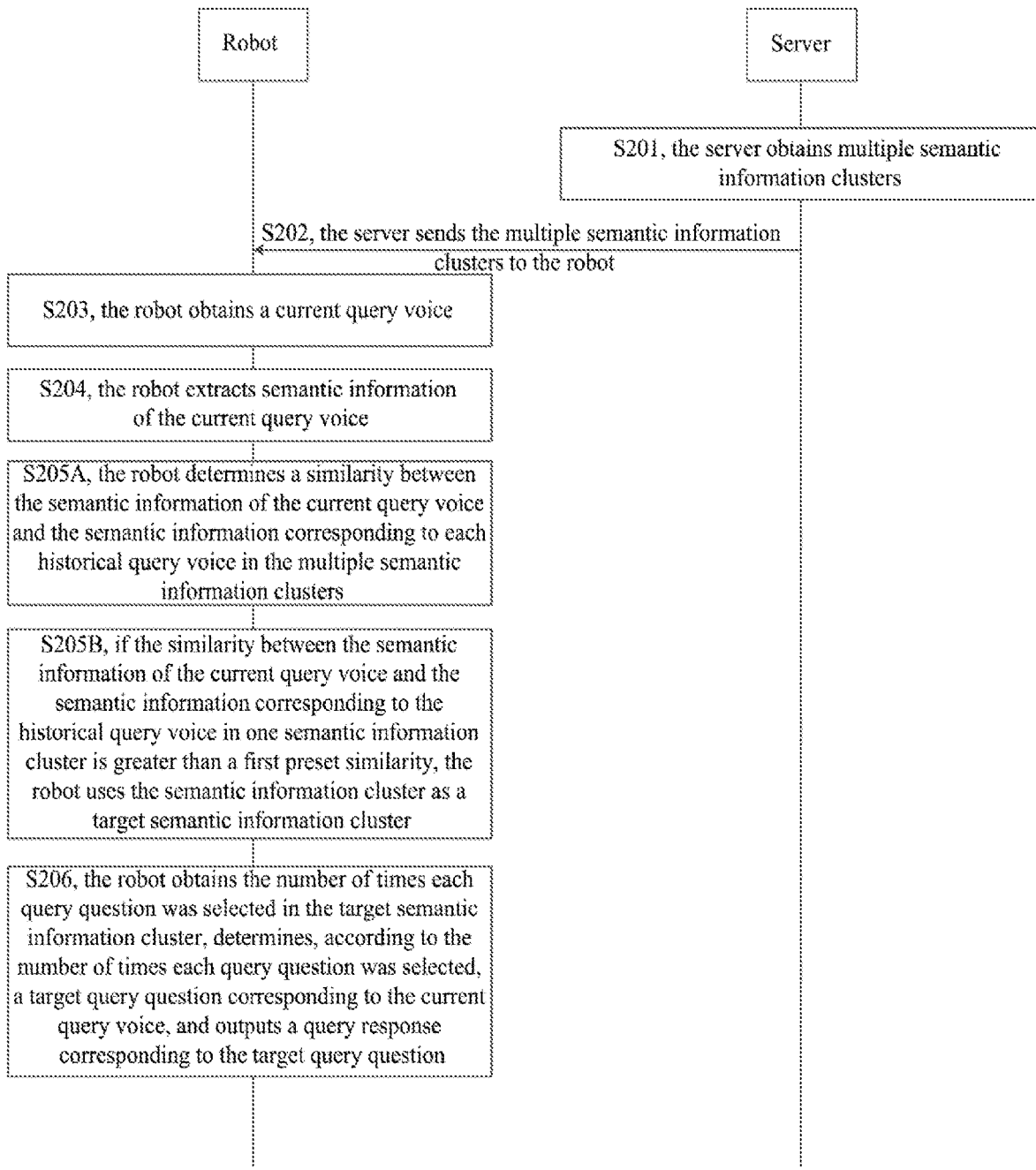
FIG. 5 is an interactive flowchart of another robot response method according to the present application.

FIG. 5 is an interactive flowchart of another robot response method according to the present application. The above step S205 specifically includes:

S205A, the robot determines a similarity between the semantic information of the current query voice and the semantic information corresponding to each historical query voice in the multiple semantic information clusters; and S205B, if the similarity between the semantic information of the current query voice and the semantic information corresponding to the historical query voice in one semantic information cluster is greater than a first preset similarity, the robot uses the semantic information cluster as the target semantic information cluster.

As previously described, any semantic information can also be referred to as a semantic vector. Therefore, the robot determines the similarity between the semantic vector of the current query voice and the semantic vector corresponding to any historical query voice in the following ways: multiplication dot is used for two semantic vectors to obtain the similarity of the two semantic vectors, where the greater the result of multiplication dot is, the higher the similarity of the two semantic vectors is. Alternatively, a distance between the two semantic vectors is calculated, and the larger the distance is, the lower the similarity between the two semantic vectors is.

In an embodiment, the above first preset similarity may be set as required, for example, it may be 0.8, 0.9, etc., which is not limited in the present application.

In this embodiment, the robot converts voice into semantic information; determines, according to the similarity between the semantic information of the current query voice and the semantic information corresponding to the historical query voice in the multiple semantic information clusters, the target semantic information cluster; obtains, according to the number of times the historical query question was selected in the target semantic information cluster, the optimal answer to the current query question, thus accurate answers to the question without clear answers can be obtained, thereby improving the efficiency in obtaining the accurate answers.

The method for the server to obtain multiple semantic information clusters are described as follows.

Figure 6:
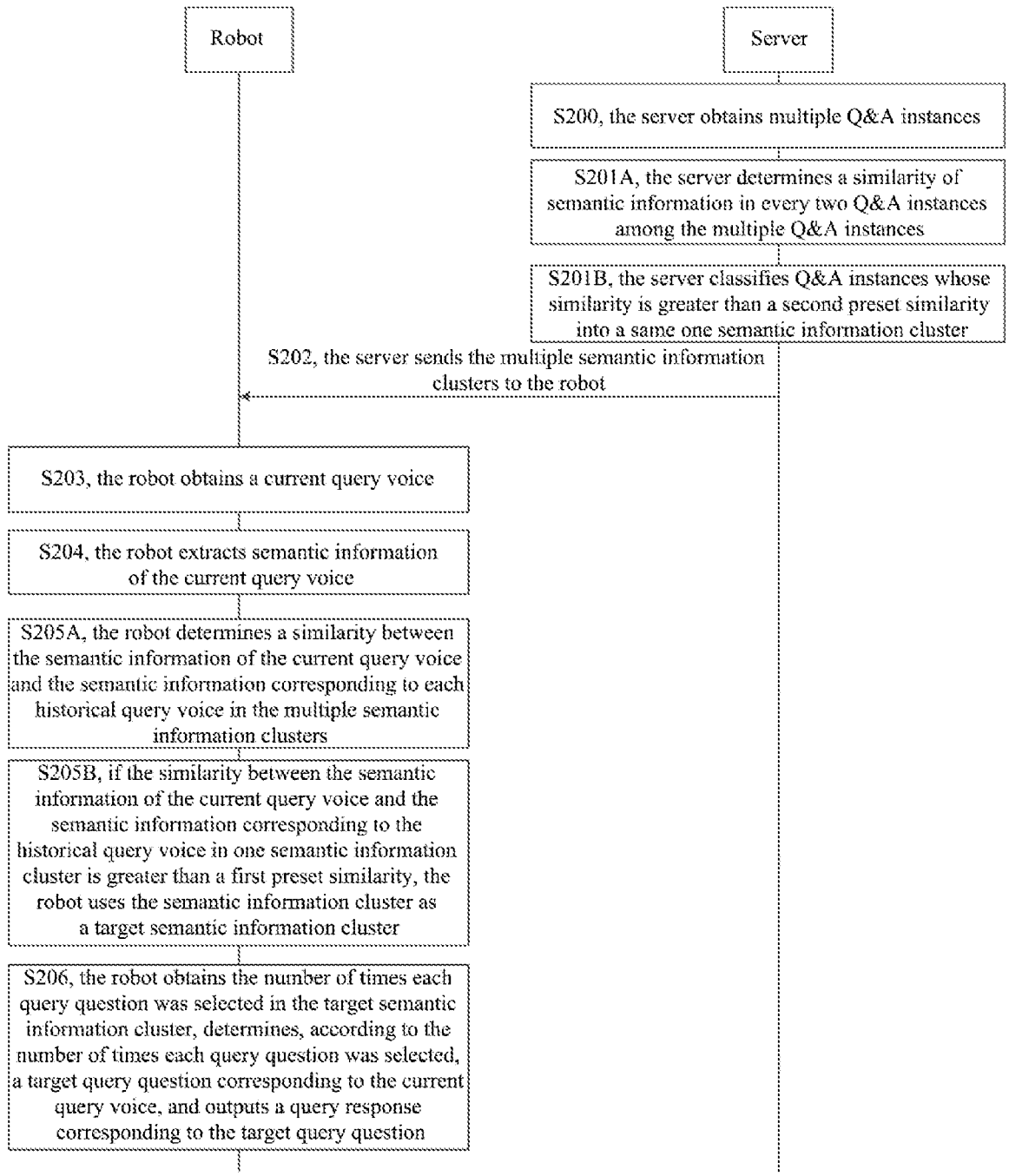
FIG. 6 is an interactive flowchart of a further robot response method according to the present application.

Option I: FIG. 6 is an interactive flowchart of a further robot response method according to the present application. Further, before step S201, it further includes:

S200, the server obtains multiple Q&A instances.

Correspondingly, step S201 includes:

S201A, the server determines a similarity of the semantic information in every two Q&A instances among the multiple Q&A instances; and S201B, the server classifies Q&A instances whose similarity is greater than a second preset similarity into a same one semantic information cluster.

Steps S200 to S201B are described as follows.

In the embodiment of the present application, there is provided a method for obtaining the semantic information cluster, which is based on Density-Based Spatial Clustering of Applications with Noise (DBScan). DBScan defines a cluster as the largest set of densely connected points, which can divide regions with sufficiently high density into clusters, and can discover clusters of arbitrary shapes in the noisy spatial database.

In this embodiment, the semantic information may be referred to as a semantic vector, and the similarity of two pieces of semantic information can be the result of multiplication dot of the two semantic vectors. The server first obtains multiple Q&A instances, and determines the semantic similarity of every two Q&A instances. If the similarity between the two Q&A instances is greater than the second preset similarity, the server determines that the two Q&A instances belong to the same semantic information cluster, so that multiple semantic information clusters are obtained, and Q&A instances in each semantic information cluster have sufficiently high similarity.

In an embodiment, the above second preset similarity may be set as required, for example, it may be 0.8, 0.9, etc., which is not limited in the present application.

In an embodiment, the server may periodically obtain the semantic information cluster. For example, at 12:00 PM every day, the server regularly looks back to the Q&A instances in the past week, so as to establish and obtain multiple semantic information clusters.

Figure 7:
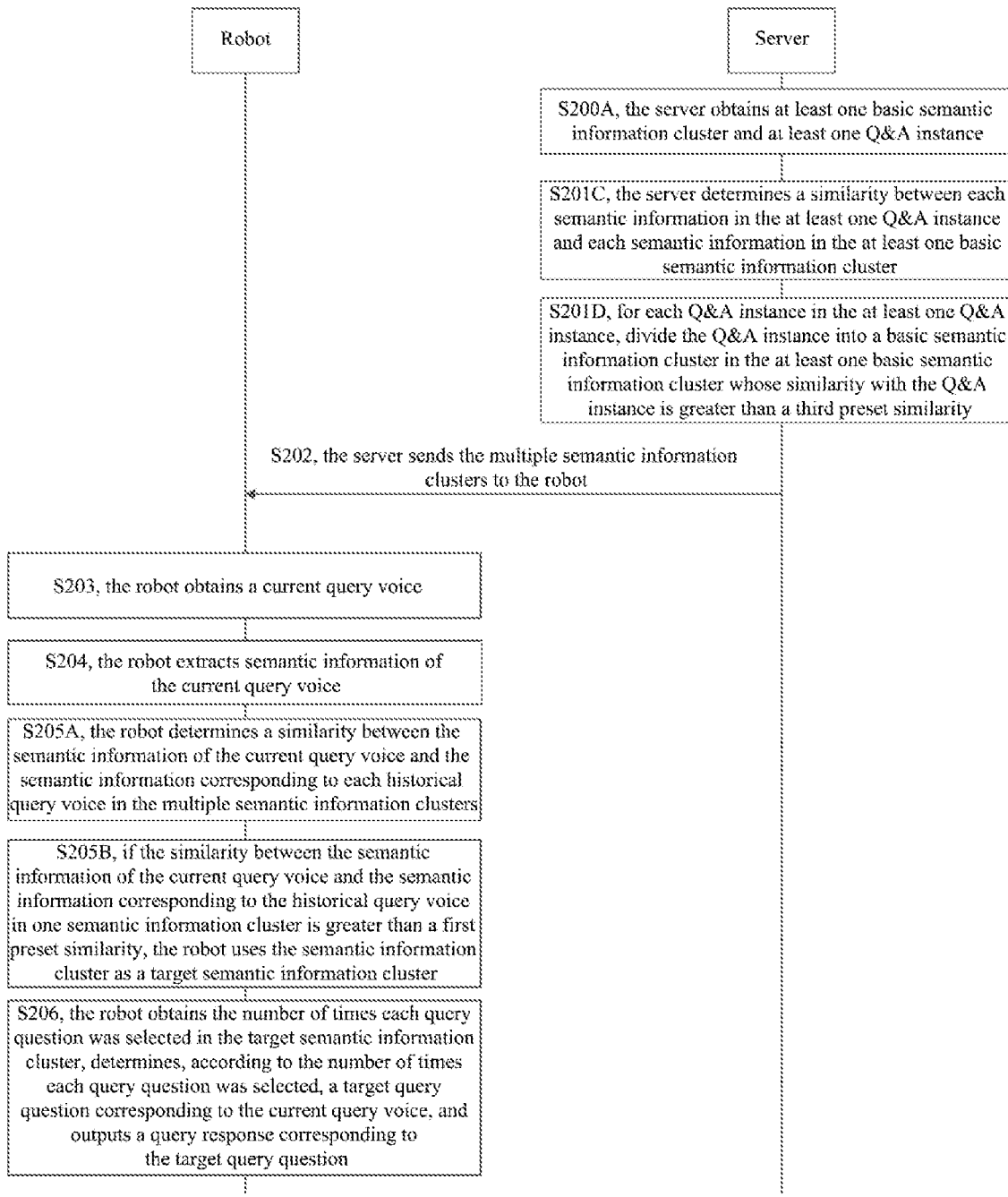
FIG. 7 is an interactive flowchart of yet another robot response method according to the present application.

Option II: FIG. 7 is an interactive flowchart of yet another robot response method according to the present application. Further, before step S201, it also includes:

S200A, the server obtains at least one basic semantic information cluster and at least one Q&A instance.

Correspondingly, step S201 includes:

S201C, the server determines a similarity between each semantic information in the at least one Q&A instance and each semantic information in the at least one basic semantic information cluster; and S201D, for each Q&A instance in the at least one Q&A instance, the server divides the Q&A instance into a basic semantic information cluster in the at least one basic semantic information cluster whose similarity with the Q&A instance is greater than a third preset similarity.

The so-called basic semantic information cluster refers to a currently established semantic information cluster, and the server can generate a new semantic information cluster on the basis of this semantic information cluster.

In an embodiment, the above third preset similarity may be set as required, for example, it may be 0.8, 0.9, etc., which is not limited in the present application.

In an embodiment, the server may periodically obtain at least one Q&A instance. For example: the server looks back to, every minute, the Q&A instance of the last one minute, so as to update the basic semantic information cluster.

In the present application, there is no specific limitation on the obtaining frequency and obtaining time of the Q&A instance and the basic semantic information cluster.

In view of the foregoing, in the present application, the server can obtain the multiple semantic information clusters through the above two options, and send the multiple semantic information clusters to the robot, so that the robot determine, according to the multiple semantic information clusters, the target semantic information cluster corresponding to the current query voice. The server can periodically obtain the multiple semantic information clusters, that is, the multiple semantic information clusters are dynamically changed, which is more conducive to providing users with accurate answers.

Figure 8:
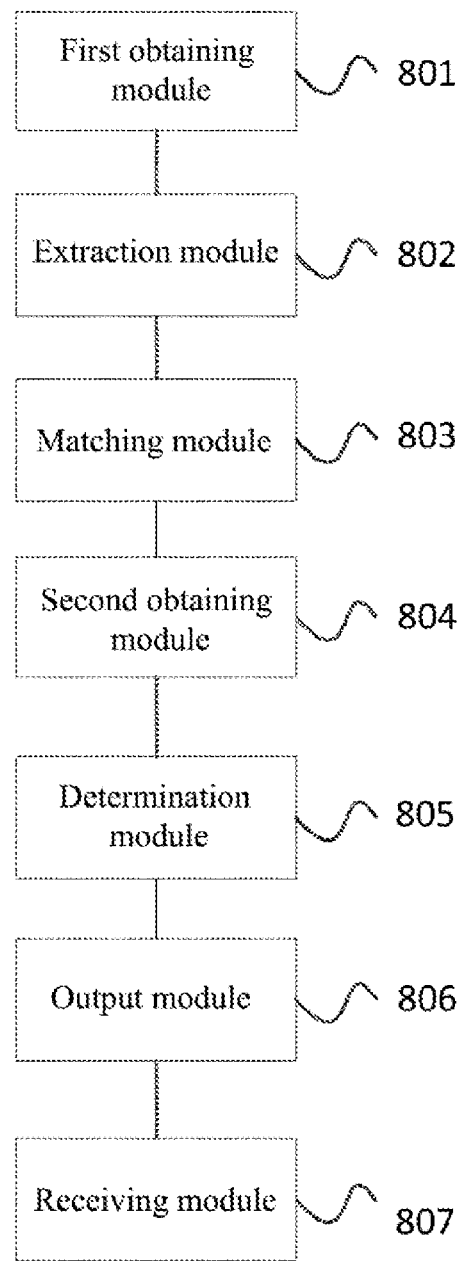
FIG. 8 is a schematic structural diagram of a robot response apparatus according to the present application.

FIG. 8 is a schematic structural diagram of a robot response apparatus according to the present application. As shown in FIG. 8, the robot response apparatus includes:

a first obtaining module 801, configured to obtain the current query voice;

an extraction module 802, configured to extract semantic information of the current query voice;

a matching module 803, configured to match the semantic information of the current query voice with multiple semantic information clusters stored in advance to get a matched target semantic information cluster, where each semantic information cluster includes: at least one Q&A instance, and each Q&A instance includes: semantic information corresponding to a historical query voice and a query question selected in a query list corresponding to the historical query voice;

a second obtaining module 804, configured to obtain the number of times each query question was selected in the target semantic information cluster;

a determination module 805, configured to determine, according to the number of times each query question was selected, a target query question corresponding to the current query voice; and an output module 806, configured to output a query response corresponding to the target query question.

In an embodiment, the matching module 803 is specifically configured to: determine a similarity between the semantic information of the current query voice and the semantic information corresponding to each historical query voice in the multiple semantic information clusters; and if the similarity between the semantic information of the current query voice and the semantic information corresponding to the historical query voice in one semantic information cluster is greater than a first preset similarity, use the semantic information cluster as the target semantic information cluster.

In an embodiment, the determination module 805 is specifically configured to: determine, among the query questions, the query question whose number of times of being selected is greater than a preset number of times as the target query question.

In an embodiment, the robot response apparatus further includes:

a receiving module 807, configured to receive the multiple semantic information clusters sent by a server.

The robot response apparatus according to the present application can perform the robot response method corresponding to the above robot side. For the content and effects of the above apparatus, please refer to the method embodiments, which will not be repeated herein.

Figure 9:
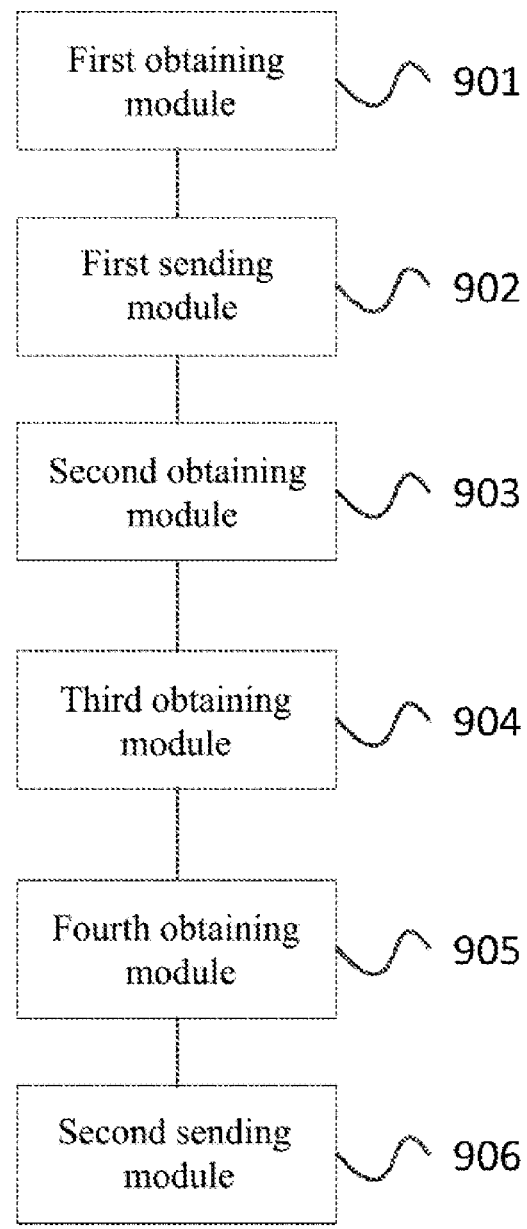
FIG. 9 is a schematic structural diagram of another robot response apparatus according to the present application.

FIG. 9 is a schematic structural diagram of another robot response apparatus according to the present application. As shown in FIG. 9, the robot response apparatus includes:

a first obtaining module 901, configured to obtain multiple semantic information clusters, where each semantic information cluster includes: at least one Q&A instance, and each Q&A instance includes: semantic information corresponding to a historical query voice and a query question selected in a query list corresponding to the historical query voice; and a first sending module 902, configured to send the multiple semantic information clusters to a robot.

In an embodiment, the robot response apparatus further includes:

a second obtaining module 903, configured to obtain multiple Q&A instances; correspondingly, the first obtaining module is specifically configured to: determine a similarity of the semantic information in every two Q&A instances among the multiple Q&A instances; and classify Q&A instances whose similarity is greater than a second preset similarity into a same one semantic information cluster.

In an embodiment, the robot response apparatus further includes:

a third obtaining module 904, configured to obtain at least one basic semantic information cluster and at least one Q&A instance; correspondingly, the first obtaining module is specifically configured to: update the at least one basic semantic information cluster according to the at least one Q&A instance to obtain the multiple semantic information clusters.

In an embodiment, the first obtaining module 901 is specifically configured to: determine a similarity between each semantic information in the at least one Q&A instance and each semantic information in the at least one basic semantic information cluster; and for each Q&A instance in the at least one Q&A instance, divide the Q&A instance into a basic semantic information cluster in the at least one basic semantic information cluster whose similarity with the Q&A instance is greater than a third preset similarity.

In an embodiment, the robot response apparatus further includes:

a fourth obtaining module 905, configured to obtain the number of times each query question was selected in the multiple semantic information clusters; and a second sending module 906, configured to send the number of times each query question was selected in the multiple semantic information clusters to the robot.

The robot response apparatus according to the present application can perform the robot response method corresponding to the above server side. For the content and effects of the above apparatus, please refer to the method embodiments, which will not be repeated herein.

According to the embodiments of the present application, the present application further provides a robot and a readable storage medium.

Figure 10:
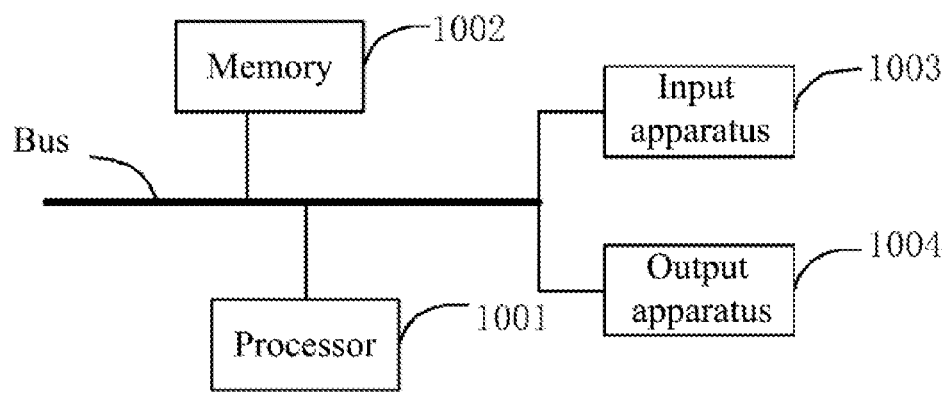
FIG. 10 is a schematic structural diagram of a robot according to the present application.

FIG. 10 is a schematic structural diagram of a robot according to the present application. Components shown herein, their connections and relationships, and their functions are provided by way of example only, and do not limit implementations of the present application described and/or claimed herein.

As shown in FIG. 10, the robot includes: a processor 1001 and a memory 1002; various components are interconnected using different buses and may be mounted on a common motherboard or otherwise as desired. The processor 1001 can process instructions executed within the robot, involving instructions for graphical information, which are stored in or on the memory to be displayed on an external input/output apparatus (such as a display device coupled to an interface). In other implementations, multiple processors and/or multiple buses may be used with multiple memories, if desired. In FIG. 10, a processor 1001 is used as an example.

The memory 1002, as a non-transitory computer-readable storage medium, can be used to store non-transitory software programs, non-transitory computer-executable programs and modules, like the program instructions/modules corresponding to the robot response method in the embodiments of the present application (for example, the first obtaining module 801, the extraction module 802, and the matching module 803 shown in FIG. 8). The processor 1001 executes non-transitory software programs, instructions and modules stored in the memory 1002, so as to execute various functional applications and data processing of the server, thereby implementing the robot response method in the above method embodiments.

The robot may further include: an input apparatus 1003 and an output apparatus 1004. The processor 1001, the memory 1002, the input apparatus 1003 and the output apparatus 1004 may be connected by a bus or in other ways, and the connection by a bus is taken as an example in FIG. 10.

The input apparatus 1003 can receive input numerical or character information, and generate key signal input related to user settings and function control of the robot, such as a touch screen, keypad, mouse, or multiple mouse buttons, trackball, joystick, and other input apparatuses. The output apparatus 1004 may be an output device such as a display device of the robot. The display device may include, but is not limited to, a liquid crystal display (LCD), a light emitting diode (LED) display, and a plasma display. In some implementations, the display device may be a touch screen.

The robot in the embodiments of the present application can be used to execute the technical solutions in the above method embodiments of the present application, and the implementation principles and technical effects thereof are similar, and will not be repeated herein.

Figure 11:
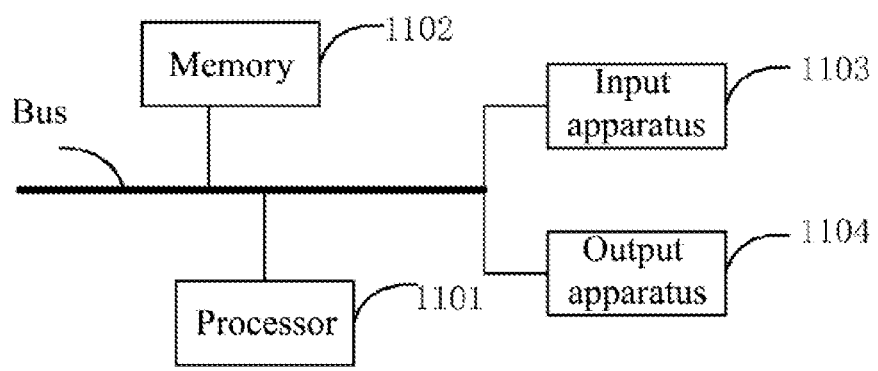
FIG. 11 is a schematic structural diagram of a server according to the present application.

FIG. 11 is a schematic structural diagram of a server according to the present application. Components shown herein, their connections and relationships, and their functions are provided by way of example only, and do not limit implementations of the present application described and/or claimed herein.

As shown in FIG. 11, the server includes: a processor 1101 and a memory 1102; various components are interconnected using different buses and may be mounted on a common motherboard or otherwise as desired. The processor 1101 can process instructions executed within the server, involving instructions for graphical information, which are stored in or on the memory to be displayed on an external input/output apparatus (such as a display device coupled to an interface). In other implementations, multiple processors and/or multiple buses may be used with multiple memories, if desired. In FIG. 11, a processor 1101 is used as an example.

The memory 1102, as a non-transitory computer-readable storage medium, can be used to store non-transitory software programs, non-transitory computer-executable programs and modules, like the program instructions/modules corresponding to the robot response method in the embodiments of the present application (for example, the first obtaining module 901, the first sending module 902, and the second obtaining module 903 shown in FIG. 9). The processor 1101 executes non-transitory software programs, instructions and modules stored in the memory 1102, so as to execute various functional applications and data processing of the server, thereby implementing the robot response method in the above method embodiments.

The server may further include: an input apparatus 1103 and an output apparatus 1104. The processor 1101, the memory 1102, the input apparatus 1103 and the output apparatus 1104 may be connected by a bus or in other ways, and the connection by a bus is taken as an example in FIG. 11.

The input apparatus 1103 can receive input numerical or character information, and generate key signal input related to user settings and function control of the server, such as a touch screen, keypad, mouse, or multiple mouse buttons, trackball, joystick, and other input apparatuses. The output apparatus 1104 may be an output device such as a display device of the server. The display device may include, but is not limited to, a liquid crystal display (LCD), a light emitting diode (LED) display, and a plasma display. In some implementations, the display device may be a touch screen.

The server in the embodiments of the present application can be used to execute the technical solutions in the above method embodiments of the present application, and the implementation principles and technical effects thereof are similar, and will not be repeated herein.

Embodiments of the present application further provide a computer-readable storage medium having stored therein computer-executable instructions, which, when executed by a processor, implement the robot response method according to any of the above embodiments.

Embodiments of the present application further provide a computer program product including computer-executable instructions, which, when executed by a processor, implement the robot response method according to any of the above embodiments.

In the several embodiments provided by the present application, it should be understood that the disclosed system, apparatus and method may be implemented in other ways. For example, the apparatus embodiments described above are merely illustrative. For example, the division of the unit is only a logical function division, and there may be other divisions in actual implementation. For example, multiple units or components may be combined or be integrated into another system, or some features can be ignored or not implemented. In addition, coupling or direct coupling or communication connection shown or discussed herein may be an indirect coupling or communication connection through some interfaces, apparatuses or modules, and may be in electrical, mechanical or other forms.

The units described as separate components may be or may not be physically separate. The components displayed as units may be or may not be physical units, that is, they may be located in one place, or may be distributed to multiple network units. Some or all of the units may be selected as required to achieve the objective of the solution of the embodiments.

In addition, the functional units in the various embodiments of the present application may be integrated into one processing unit, or each unit may exist alone, physically, or two or more units may be integrated into one unit. The above modular units can be implemented in the form of hardware, or in the form of hardware plus software functional units.

Other embodiments of the present disclosure will readily occur to those skilled in the art upon consideration of the specification and practice of the disclosure disclosed herein. The present application is intended to cover any variations, uses, or adaptations of the present disclosure that follow the general principles of the present disclosure and include common knowledge or conventional technical means in the technical field that are not disclosed in the present disclosure. The specification and embodiments are exemplary only, and the true scope and spirit of the present disclosure are subject to the following claims.

It should be understood that the present disclosure is not limited to the precise structures described above and illustrated in the accompanying drawings, and various modifications and changes may be made thereto without departing from its scope. The scope of the present disclosure is limited only by the appended claims.

The invention claimed is:

1. A robot response method, comprising:
obtaining, by a server, multiple semantic information clusters, wherein each semantic information cluster comprises: at least one question and answer (Q&A) instance, and each Q&A instance comprises: semantic information corresponding to a historical query voice and a query question selected in a query list corresponding to the historical query voice;
sending, by the server, the multiple semantic information clusters to a robot;
obtaining, by the robot, a current query voice;
extracting, by the robot, semantic information of the current query voice;
matching, by the robot, the semantic information of the current query voice with multiple semantic information clusters stored in advance to get a matched target semantic information cluster; and
obtaining, by the robot, a number of times each query question was selected in the target semantic information cluster, determining, by the robot, according to the number of times each query question was selected, a target query question corresponding to the current query voice, and outputting a query response corresponding to the target query question.

2. The method according to claim 1, wherein the matching the semantic information of the current query voice with the multiple semantic information clusters stored in advance, comprises:
determining, by the robot, a similarity between the semantic information of the current query voice and the semantic information corresponding to each historical query voice in the multiple semantic information clusters; and
if the similarity between the semantic information of the current query voice and the semantic information corresponding to the historical query voice in one semantic information cluster is greater than a first preset similarity, using, by the robot, the semantic information cluster as the target semantic information cluster.

3. The method according to claim 2, wherein the determining, according to the number of times each query question was selected, a target query question corresponding to the current query voice, comprises:
determining, by the robot, among the query questions, the query question whose number of times of being selected is greater than a preset number of times as the target query question.

4. The method according to claim 2, further comprising:
receiving, by the robot, the multiple semantic information clusters sent by a server.

5. The method according to claim 1, wherein the determining, according to the number of times each query question was selected, a target query question corresponding to the current query voice, comprises:
determining, by the robot, among the query questions, the query question whose number of times of being selected is greater than a preset number of times as the target query question.

6. The method according to claim 1, further comprising:
receiving, by the robot, the multiple semantic information clusters sent by a server.

7. A non-transitory computer-readable storage medium, wherein the computer-readable storage medium has stored therein computer-executable instructions, which, when executed by a processor, implement the robot response method according to claim 1.

8. A robot response method, comprising:
obtaining, by a server, multiple semantic information clusters, wherein each semantic information cluster comprises: at least one question and answer (Q&A) instance, and each Q&A instance comprises: semantic information corresponding to a historical query voice and a query question selected in a query list corresponding to the historical query voice; and
sending, by the server, the multiple semantic information clusters to a robot;
wherein before the obtaining multiple semantic information clusters, the method further comprises:
obtaining, by the server, at least one basic semantic information cluster and at least one Q&A instance, wherein the at least one Q&A instance is periodically obtained;
correspondingly, obtaining multiple semantic information clusters comprises:
updating, by the server, the at least one basic semantic information cluster according to the at least one Q&A instance to obtain the multiple semantic information clusters;
wherein updating the at least one basic semantic information cluster according to the at least one Q&A instance to obtain the multiple semantic information clusters, comprises:
determining, by the server, a similarity between each semantic information in the at least one Q&A instance and each semantic information in the at least one basic semantic information cluster; and
for each Q&A instance in the at least one Q&A instance, dividing, by the server, the Q&A instance into a basic semantic information cluster in the at least one basic semantic information cluster whose similarity with the Q&A instance is greater than a third preset similarity.

9. The method according to claim 8, wherein before the obtaining multiple semantic information clusters, the method further comprises:
obtaining multiple Q&A instances;
correspondingly, the obtaining multiple semantic information clusters, comprises:
determining a similarity of the semantic information in every two Q&A instances among the multiple Q&A instances; and
classifying Q&A instances whose similarity is greater than a second preset similarity into a same one semantic information cluster.

10. The method according to claim 9, further comprising:
obtaining, by the server, the number of times each query question was selected in the multiple semantic information clusters; and
sending the number of times each query question was selected in the multiple semantic information clusters to the robot.

11. The method according to claim 8, further comprising:
obtaining, by the server, the number of times each query question was selected in the multiple semantic information clusters; and
sending the number of times each query question was selected in the multiple semantic information clusters to the robot.

12. The method according to claim 8, further comprising:
obtaining, by the server, the number of times each query question was selected in the multiple semantic information clusters; and sending, by the server the number of times each query question was selected in the multiple semantic information clusters to the robot.

13. The method according to claim 8, further comprising:
obtaining, by the server, the number of times each query question was selected in the multiple semantic information clusters; and
sending, by the server, the number of times each query question was selected in the multiple semantic information clusters to the robot.

14. A robot response system, comprising:
a transceiver of a server, a memory of the server, a processor of the server, and a computer program stored on the memory of the server and operable on the processor of the server,
wherein the processor of the server, when running the computer program, is configured to:
obtain multiple semantic information clusters, wherein each semantic information cluster comprises: at least one question and answer (Q&A) instance, and each Q&A instance comprises: semantic information corresponding to a historical query voice and a query question selected in a query list corresponding to the historical query voice; and
send the multiple semantic information clusters to a robot;
wherein the robot response system further comprises a transceiver of the robot, a memory of the robot, a processor of the robot, and a computer program of the robot stored on the memory of the robot and operable on the processor of the robot,
wherein the processor of the robot, when running the computer program, is configured to:
obtain a current query voice;
extract semantic information of the current query voice;
match the semantic information of the current query voice with the multiple semantic information clusters stored in advance to get a matched target semantic information cluster;
obtain the number of times each query question was selected in the target semantic information cluster;
determine, according to the number of times each query question was selected, a target query question corresponding to the current query voice; and
control the transceiver of the robot to output a query response corresponding to the target query question;
wherein before the processor of the server obtaining multiple semantic information clusters, the processor of the server is further configured to:
obtain at least one basic semantic information cluster and at least one Q&A instance, wherein the at least one Q&A instance is periodically obtained;
update the at least one basic semantic information cluster according to the at least one Q&A instance to obtain the multiple semantic information clusters;
wherein the processor of the server is further configured to:
determine a similarity between each semantic information in the at least one Q&A instance and each semantic information in the at least one basic semantic information cluster; and
for each Q&A instance in the at least one Q&A instance, divide the Q&A instance into a basic semantic information cluster in the at least one basic semantic information cluster whose similarity with the Q&A instance is greater than a third preset similarity.

15. The system according to claim 14, wherein the processor of the robot is configured to:
- determine a similarity between the semantic information of the current query voice and the semantic information corresponding to each historical query voice in the multiple semantic information clusters; and
- if the similarity between the semantic information of the current query voice and the semantic information corresponding to the historical query voice in one semantic information cluster is greater than a first preset similarity, use the semantic information cluster as the target semantic information cluster.

16. The system according to claim 15, wherein the processor of the robot is configured to:
- determine, among the query questions, the query question whose number of times of being selected is greater than a preset number of times as the target query question.

17. The system according to claim 14, wherein the processor of the robot is configured to:
- determine, among the query questions, the query question whose number of times of being selected is greater than a preset number of times as the target query question.

18. The system according to claim 14, wherein the processor of the robot is configured to:
- control the transceiver of the robot to receive the multiple semantic information clusters sent by the server.

* * * * *